(12) United States Patent
Shan et al.

(10) Patent No.: US 11,120,177 B2
(45) Date of Patent: Sep. 14, 2021

(54) SAND MOLD DIGITAL FLEXIBLE EXTRUSION NEAR-NET FORMING OPTIMIZATION METHOD BASED ON SEARCH ALGORITHM

(71) Applicant: BEIJING NATIONAL INNOVATION INSTITUTE OF LIGHTWEIGHT, LTD., Beijing (CN)

(72) Inventors: Zhongde Shan, Beijing (CN); Feng Liu, Beijing (CN); Shuai Zhang, Beijing (CN)

(73) Assignee: BEIJING NATIONAL INNOVATION INSTITUTE OF LIGHTWEIGHT LTD., Beijing (CN)

( * ) Notice: Subject to any disclaimer, the term of this patent is extended or adjusted under 35 U.S.C. 154(b) by 511 days.

(21) Appl. No.: 16/071,266

(22) PCT Filed: Dec. 5, 2016

(86) PCT No.: PCT/CN2016/108569
§ 371 (c)(1),
(2) Date: Jul. 19, 2018

(87) PCT Pub. No.: WO2017/128863
PCT Pub. Date: Aug. 3, 2017

(65) Prior Publication Data
US 2020/0026809 A1    Jan. 23, 2020

(30) Foreign Application Priority Data

Jan. 26, 2016 (CN) .......................... 201610049275.3

(51) Int. Cl.
*G06F 30/20* (2020.01)
*B22C 19/00* (2006.01)
*G06F 113/22* (2020.01)

(52) U.S. Cl.
CPC .............. *G06F 30/20* (2020.01); *B22C 19/00* (2013.01); *G06F 2113/22* (2020.01)

(58) Field of Classification Search
CPC ...... G06F 30/20; G06F 2113/22; G06F 30/00; B22C 19/00; B22C 9/02; B22D 46/00
See application file for complete search history.

(56) References Cited

U.S. PATENT DOCUMENTS

| | | | | |
|---|---|---|---|---|
| 5,377,119 A | * | 12/1994 | Backer | ............... G06F 30/23 700/146 |
| 2011/0230993 A1 | * | 9/2011 | Shan | ............... B22C 9/02 700/98 |

(Continued)

FOREIGN PATENT DOCUMENTS

| | | |
|---|---|---|
| CN | 2745671 Y | 12/2005 |
| CN | 102773421 A | 11/2012 |

(Continued)

OTHER PUBLICATIONS

T. Ganesan, et al., "Multiobjective Optimization of Green Sand Mould System using DE and GSA," 2012 12th International Conference on Intelligent Systems Design and Applications (ISDA) pp. 1012-1016 (Year: 2012).*

(Continued)

*Primary Examiner* — Rehana Perveen
*Assistant Examiner* — Steven W Crabb
(74) *Attorney, Agent, or Firm* — Renner, Kenner Greive, Bobak Taylor & Weber

(57) ABSTRACT

Provided is a sand mold digital flexible extrusion near-net forming optimization method based on a search algorithm. The method includes: dividing a sand mold Computer Aided Design (CAD) 3D model near-net forming region; acquiring a curved surface function of a near-net forming sand mold CAD 3D model cavity; constructing a flexible extrusion array envelope volume optimization objective function;

(Continued)

determining a valid optimization interval R; translating the position of a sand mold CAD 3D model cavity to a search initial position; performing a global search in the valid optimization interval R, comparing flexible extrusion array envelope volume values, and saving the larger value as $V(x,y)_{max}$ and the corresponding position as $(x,y)_{max}$; and completing the search, translating the position of the near-net forming sand mold CAD 3D model cavity to $(x,y)_{max}$, and executing a flexible extrusion array shape adjusting procedure.

13 Claims, 2 Drawing Sheets

(56) References Cited

U.S. PATENT DOCUMENTS

| 2012/0232685 A1* | 9/2012 | Wang | G06F 30/23 |
| | | | 700/98 |
| 2014/0228997 A1* | 8/2014 | Phillips | G05B 19/4097 |
| | | | 700/182 |

FOREIGN PATENT DOCUMENTS

| CN | 104985116 A | 10/2015 |
| EP | 1724716 A1 | 11/2006 |
| JP | 58-173054 A | 10/1983 |
| JP | 62-114744 A | 5/1987 |
| JP | 2002-273547 A | 9/2002 |
| JP | 2007-334820 A | 12/2007 |
| JP | 2012-519594 A | 8/2012 |
| KR | 10-2015-0106829 A | 9/2015 |

OTHER PUBLICATIONS

Japanese Examination Report, dated Jul. 8, 2019 for counterpart Japanese patent application No. 2018-537663, and English translation thereof.

Chinese Search Report dated Jan. 26, 2016 for Counterpart Japanese application No. 2016100492753.

* cited by examiner

SAND MOLD DIGITAL FLEXIBLE EXTRUSION NEAR-NET FORMING OPTIMIZATION METHOD BASED ON SEARCH ALGORITHM

TECHNICAL FIELD

The present disclosure relates to the field of die-free casting, and more particularly to a sand mold digital flexible extrusion near-net forming optimization method based on a search algorithm.

BACKGROUND

Due to the increasingly serious environmental problems and the growing awareness of environmental protection of people, a wave of green manufacturing has been created worldwide, which has promoted the development of green manufacturing technologies. As a low-entropy production manufacturing mode, green manufacturing meets the requirements of minimizing environmental pollution throughout the entire life cycle of product designing, manufacturing, using, and scrapping, and is harmless or minimally harmful to the ecological environment, so as to achieve the purpose of environmental protection. Moreover, green manufacturing has the advantages of high utilization of raw materials and low energy consumption.

The application of a digital die-free casting precision forming technology in sand mold forming has greatly improved the greening level of casting mold manufacturing in the casting field, eliminated the manufacturing process of wood molds or metal molds, and saved a large amount of raw materials. However, the digital die-free casting precision forming technology reduces the sand mold batching production efficiency to a certain extent due to the problem of large molding sand removal amount in a sand block cutting process, which severely restricts the promotion of this technology in large-batch production in a sand mold. In order to solve the above problems, the State Key Laboratory of Advanced Forming Technology and Equipment innovatively proposes a sand mold digital flexible extrusion forming technology, thereby achieving near-net forming of a sand mold, shortening the production time of the sand mold, improving the production efficiency, and saving molding sand materials and energy.

Some embodiments of the present disclosure provide a near-net forming optimization method based on a search algorithm for a sand mold digital flexible extrusion forming technology.

SUMMARY

The present disclosure provides a sand mold digital flexible extrusion near-net forming optimization method based on a search algorithm, which may implement sand mold digital flexible extrusion near-net forming, so as to effectively reduce molding sand waste, and improve the forming efficiency and quality of a sand mold.

To this end, the present disclosure adopts the technical solutions as follows.

(1) dividing a sand mold Computer Aided Design (CAD) 3D model near-net forming region into m×n sub-regions, each having a size of a×b, according to arrangement of m×n flexible extrusion arrays, each having a size of a×b, on a sand mold digital flexible extrusion working platform.

(2) directly acquiring a curved surface function $$f(x,y) = \begin{bmatrix} f_{1,1}(x,y)_{min} & \cdots & f_{1,j}(x,y)_{min} & \cdots & f_{1,n}(x,y)_{min} \\ \vdots & \ddots & \vdots & \ddots & \vdots \\ f_{i,1}(x,y)_{min} & \cdots & f_{i,j}(x,y)_{min} & \cdots & f_{i,n}(x,y)_{min} \\ \vdots & \ddots & \vdots & \ddots & \vdots \\ f_{m,1}(x,y)_{min} & \cdots & f_{m,j}(x,y)_{min} & \cdots & f_{m,n}(x,y)_{min} \end{bmatrix}$$

of a near-net forming sand mold CAD 3D model cavity under driving of a sand mold CAD 3D model, where $i,j \in Z$, and $1 \leq i \leq m$, $1 \leq j \leq n$;

(3) constructing a flexible extrusion array envelope volume optimization objective function $V(x,y) = a \times b \times \sum_{i=1}^{n} \sum_{i=1}^{m} [f_{i,j}(x,y)_{min}]$ in the near-net forming sand mold CAD 3D model cavity;

(4) determining a valid optimization interval $$R = \begin{cases} x \in \left[\frac{am}{2} - \frac{a}{2}, \frac{am}{2} + \frac{a}{2}\right) \\ y \in \left[\frac{bn}{2} - \frac{b}{2}, \frac{bn}{2} + \frac{b}{2}\right) \end{cases}$$

of the position of the near-net forming sand mold CAD 3D model cavity;

(5) translating the position of the near-net forming sand mold CAD 3D model cavity to a search initial position $A_{1,1}$, which is equal to $$\left(\frac{am}{2} - \frac{a}{2}, \frac{bn}{2} - \frac{b}{2}\right);$$

(6) determining a search direction as an x increment direction and a y increment direction;

(7) determining search step length parameters $\Delta x$ and $\Delta y$ in x and y directions according to error requirements of the x and y directions respectively;

(8) performing search in the valid optimization interval R, comparing flexible extrusion array envelope volume values $V(x,y)_{p,q}$ calculated in a search process, saving a larger value as $V(x,y)_{max}$, saving the corresponding position as $(x,y)_{max}$, and recording the corresponding value of $f_{i,j}(x,y)_{min}$; and (9) completing the search, translating the position of the near-net forming sand mold CAD 3D model cavity to $(x,y)_{max}$, and executing a flexible extrusion array shape adjusting procedure.

In an exemplary embodiment, a sand mold digital flexible extrusion array is an m×n array consisting of extrusion units, each having a length of a, a width of b and a height of h, and a forming space of a near-net forming sand mold on the sand mold digital flexible extrusion array is am×bn×h. The sand mold CAD 3D model near-net forming region is divided into m×n sub-regions, each having a size of a×b, according to the arrangement of sand mold flexible extrusion arrays.

Further, the method comprising the following steps:
(1) dividing a sand mold Computer Aided Design (CAD) 3D model near-net forming region;
(2) acquiring a curved surface function of a near-net forming sand mold CAD 3D model cavity;
(3) constructing a flexible extrusion array envelope volume optimization objective function;
(4) determining a valid optimization interval R; and (5) performing a global search in the valid optimization interval R, and comparing flexible extrusion array envelope volume values.

Further, after the valid optimization interval R is determined, a position of the near-net forming sand mold CAD 3D model cavity is parallel shifted to a search initial position, and the global search is performed in the valid optimization interval R.

Further, after the position of the near-net forming sand mold CAD 3D model cavity is parallel shifted to the search initial position, a search direction and search step lengths are determined, and the global search is performed in the valid optimization interval R.

Further, after the global search performed in the valid optimization interval R is completed, the position of the near-net forming sand mold CAD 3D model cavity is parallel shifted to a position corresponding to a larger value in the flexible extrusion array envelope volume values.

Further, in step (1), the sand mold CAD 3D model near-net forming region is divided into m×n sub-regions, each having a size of a×b, according to arrangement of m×n flexible extrusion arrays, each having a size of a×b, on a sand mold digital flexible extrusion working platform.

Further, in step (1), a sand mold digital flexible extrusion array is an m×n array consisting of extrusion units, each having a length of a, a width of b and a height of h, and a forming space of a near-net forming sand mold on the sand mold digital flexible extrusion array is am×bn×h; and the sand mold CAD 3D model near-net forming region is divided into m×n sub-regions, each having a size of a×b, according to arrangement of sand mold flexible extrusion arrays.

Further, in step (2), a curved surface function $$f(x,y) = \begin{bmatrix} f_{1,1}(x,y)_{min} & \cdots & f_{1,j}(x,y)_{min} & \cdots & f_{1,n}(x,y)_{min} \\ \vdots & \ddots & \vdots & \ddots & \vdots \\ f_{i,1}(x,y)_{min} & \cdots & f_{i,j}(x,y)_{min} & \cdots & f_{i,n}(x,y)_{min} \\ \vdots & \ddots & \vdots & \ddots & \vdots \\ f_{m,1}(x,y)_{min} & \cdots & f_{m,j}(x,y)_{min} & \cdots & f_{m,n}(x,y)_{min} \end{bmatrix}$$

of a near-net forming sand mold CAD 3D model cavity is directly acquired under driving of a sand mold CAD 3D model, where $i,j \in Z$, and $1 \le i \le m$, $1 \le j \le n$.

Further, in step (3), a flexible extrusion array envelope volume optimization objective function $V(x,y) = a \times b \times \sum_{j=1}^{n} \sum_{i=1}^{m} [f_{i,j}(x,y)_{min}]$ in the near-net forming sand mold CAD 3D model cavity is constructed.

Further, in step (4), a valid optimization interval $$R = \begin{cases} x \in \left[\dfrac{am}{2} - \dfrac{a}{2}, \dfrac{am}{2} + \dfrac{a}{2}\right) \\ y \in \left[\dfrac{bn}{2} - \dfrac{b}{2}, \dfrac{bn}{2} + \dfrac{b}{2}\right) \end{cases}$$

of the position of the near-net forming sand mold CAD 3D model cavity is determined.

Further, after the valid optimization interval R is determined, the position of the near-net forming sand mold CAD 3D model cavity is parallel shifted to a search initial position $A_{1,1}$, which is equal to $$\left(\dfrac{am}{2} - \dfrac{a}{2}, \dfrac{bn}{2} - \dfrac{b}{2}\right),$$

and a global search is performed in the valid optimization interval R.

Further, after the position of the sand mold CAD 3D model cavity is parallel shifted to the search initial position, a search direction is determined as an x increment direction and a y increment direction, and the global search is performed in the valid optimization interval R.

Further, after the search direction is determined as the x increment direction and the y increment direction, search step length parameters Δx and Δy in x and y directions are determined according to error requirements of the x and y directions respectively, and the global search is performed in the valid optimization interval R. Further, search is performed in the valid optimization interval R, flexible extrusion array envelope volume values $V(x,y)_{p,q}$ calculated in a search process are compared, the larger value is saved as $V(x,y)_{max}$, the corresponding position is saved as $(x,y)_{max}$, and the corresponding value of $f_{i,j}(x,y)_{min}$ is recorded.

Further, after the search is completed, the position of the sand mold CAD 3D model cavity is parallel shifted to $(x,y)_{max}$, and a flexible extrusion array shape adjusting procedure is executed.

Some embodiments of the present disclosure provide a near-net forming optimization method based on a search algorithm for a sand mold digital flexible extrusion forming technology.

BRIEF DESCRIPTION OF THE DRAWINGS

The accompanying drawings, which constitute a part of this application, are used to provide a deeper understanding of the present disclosure, and the exemplary embodiments of the present disclosure and the description thereof are used to explain the present disclosure, but do not constitute improper limitations to the present disclosure. In the drawing.

Figure 1:
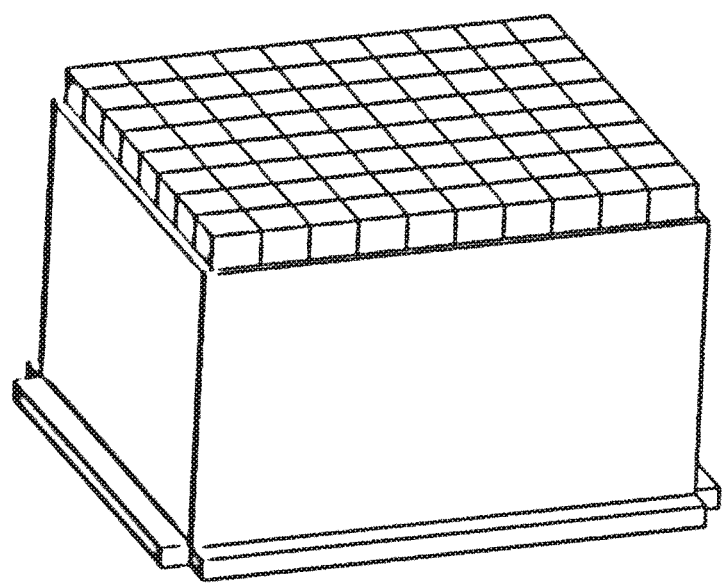
FIG. 1 is a schematic diagram of a sand mold digital flexible extrusion forming platform according to the present disclosure.

Herein, the above drawings include the following reference numerals:

1, flexible extrusion array; 2, sand mold; 3, sand mold cavity.

DETAILED DESCRIPTION OF THE EMBODIMENTS

According to specific embodiments of the present disclosure, a sand mold digital flexible extrusion near-net forming optimization method based on a search algorithm is provided. The method comprises the steps as follows.

(1) A sand mold digital flexible extrusion array is an m×n array consisting of extrusion units, each having a length of a, a width of b and a height of h, and a forming space of a near-net forming sand mold on the sand mold digital flexible extrusion array is am×bn×h. A sand mold CAD 3D model near-net forming region is divided into m×n sub-regions, each having a size of a×b, according to the arrangement of sand mold flexible extrusion arrays.

(2) A curved surface function $$f(x,y) = \begin{bmatrix} f_{1,1}(x,y)_{min} & \cdots & f_{1,j}(x,y)_{min} & \cdots & f_{1,n}(x,y)_{min} \\ \vdots & \ddots & \vdots & \ddots & \vdots \\ f_{i,1}(x,y)_{min} & \cdots & f_{i,j}(x,y)_{min} & \cdots & f_{i,n}(x,y)_{min} \\ \vdots & \ddots & \vdots & \ddots & \vdots \\ f_{m,1}(x,y)_{min} & \cdots & f_{m,j}(x,y)_{min} & \cdots & f_{m,n}(x,y)_{min} \end{bmatrix}$$

of a near-net forming sand mold CAD 3D model cavity is directly acquired under the driving of a sand mold CAD 3D model, where $i,j \in Z$, and $1 \leq i \leq m$, $1 \leq j \leq n$.

(3) Because the degree of a near-net forming sand mold cavity approaching a sand mold cavity is directly proportional to the size of an envelope volume of an extrusion unit envelope surface of the near-net forming sand mold cavity, sand mold digital flexible extrusion near-net forming optimization is equivalent to the solution of a maximum value of an envelope volume of a flexible extrusion array in the near-net forming sand mold cavity, so an objective function $V(x,y) = a \times b \times \sum_{j=1}^{8} \sum_{i=1}^{10} [f_{i,j}(x,y)_{min}]$ is established.

(4) In order to make the near-net forming sand mold cavity approach the sand mold cavity, search calculation for $V(x,y)$ may be performed within a plane feasible region of the sand mold digital flexible extrusion array. Because the sand mold digital flexible extrusion array consists of m×n a×b×h identical arrays, a valid optimization interval may be reduced to a region $$R = \begin{cases} x \in \left[\frac{am}{2} - \frac{a}{2}, \frac{am}{2} + \frac{a}{2}\right) \\ y \in \left[\frac{bn}{2} - \frac{b}{2}, \frac{bn}{2} + \frac{b}{2}\right) \end{cases}$$

on a sand mold digital flexible extrusion array platform.

(5) In a process of operating a search algorithm, it is convenient to search a feasible region, and the position of the sand mold cavity is parallel shifted from the center A1, which is equal to (am/2,bn/2), of the flexible extrusion array platform to a search initial position $A_{1,1}$, which is equal to $$\left(\frac{am}{2} - \frac{a}{2}, \frac{bn}{2} - \frac{b}{2}\right).$$

(6) A search direction is determined as an x increment direction and a y increment direction.

(7) Search step length parameters $\Delta x$ and $\Delta y$ in x and y directions are determined according to error requirements of the x and y directions respectively.

(8) Search is performed in the valid optimization interval R, flexible extrusion array envelope volume values $V(x,y)_{p,q}$ calculated in a search process are compared, the larger value is saved as $V(x,y)_{max}$, the corresponding position is saved as $(x,y)_{max}$, and the corresponding value of $f_i(x,y)_{min}$ is recorded.

(9) After the search is completed, the position of the sand mold cavity is parallel shifted to $(x,y)_{max}$, and the height of each extrusion unit is increased or decreased according to the value of $f_{i,j}(x,y)_{min}$ recorded in the previous step.

In order to provide a deeper understanding of the present disclosure, the present disclosure will be described in detail below with reference to the embodiments for a sand mold digital flexible extrusion forming prototype of a 10×8 array consisting of flexible extrusion units having a size of 80 mm×80 mm×250 mm in FIG. 1 to FIG. 3.

Figure 2:
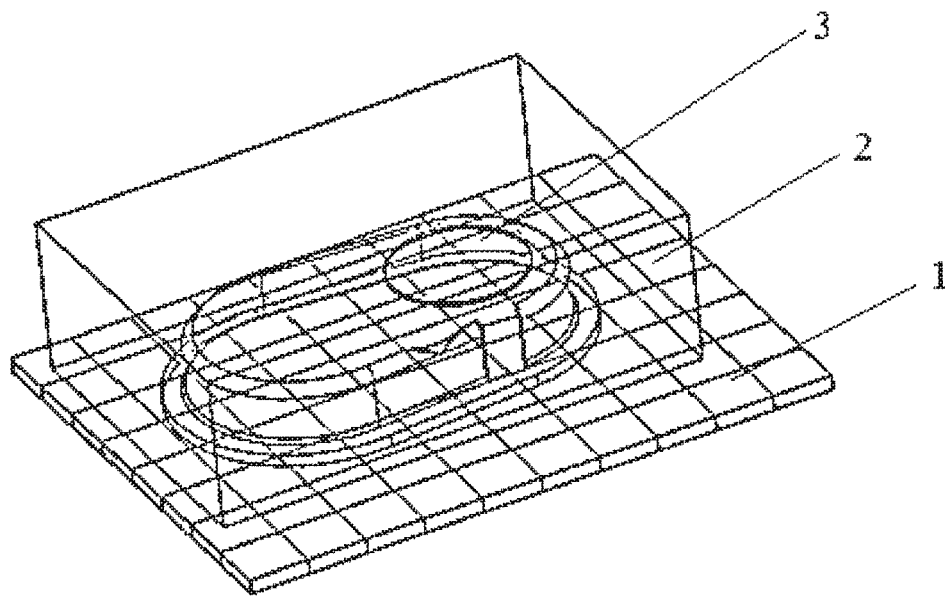
FIG. 2 is a schematic diagram of translating a near-net forming sand mold cavity to a search initial position according to the present disclosure.
Figure 3:
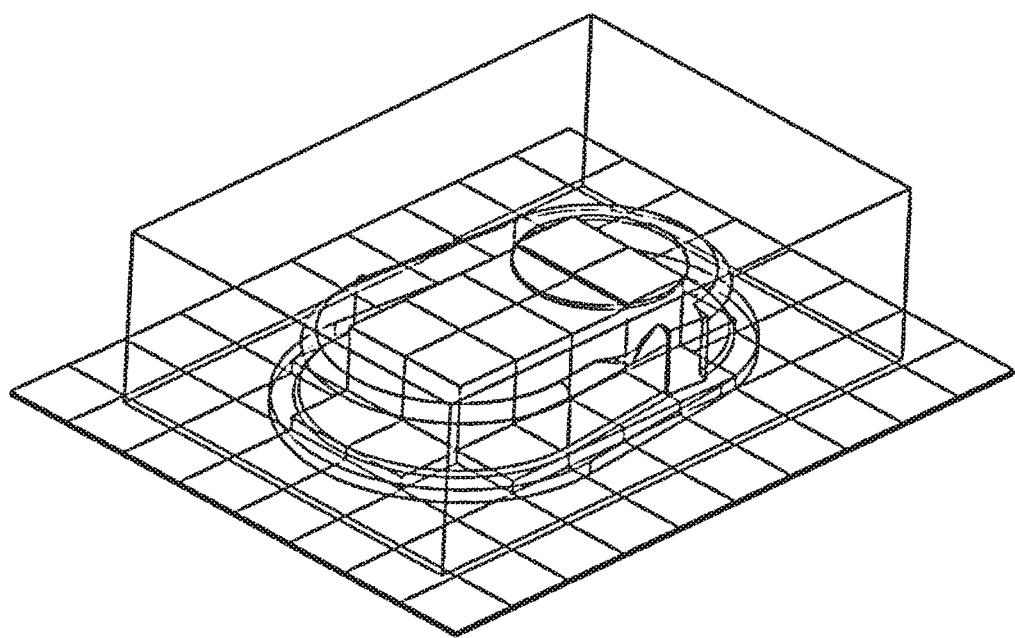
FIG. 3 is a schematic diagram of filling a sand mold cavity with flexible extrusion units at an optimal position of a near-net forming sand mold according to the present disclosure.

As shown in FIG. 1, FIG. 2 and FIG. 3, the present disclosure relates to a sand mold digital flexible extrusion near-net forming optimization method based on a search algorithm.

As shown in FIG. 1, a sand mold digital flexible extrusion array 1 is a 10×8 array consisting of extrusion units, each having a length of 80 mm, a width of 80 mm and a height of 250 mm. As shown in FIG. 2, a forming space of a sand mold 2 on the sand mold digital flexible extrusion array 1 is 80 mm×80 mm×250 mm. In order to study the problem of discretization, a sand mold digital flexible extrusion array plane is divided into 10×8 sub-regions having a size of 80 mm×80 mm.

A curved surface function of a near-net forming sand mold cavity 3 is established:

$$f(x,y) = \begin{bmatrix} f_{1,1}(x,y)_{min} & \cdots & f_{1,j}(x,y)_{min} & \cdots & f_{1,8}(x,y)_{min} \\ \vdots & \ddots & \vdots & \ddots & \vdots \\ f_{i,1}(x,y)_{min} & \cdots & f_{i,j}(x,y)_{min} & \cdots & f_{i,8}(x,y)_{min} \\ \vdots & \ddots & \vdots & \ddots & \vdots \\ f_{10,1}(x,y)_{min} & \cdots & f_{10,j}(x,y)_{min} & \cdots & f_{10,8}(x,y)_{min} \end{bmatrix},$$

where $i,j \in Z$, and $1 \leq i \leq 10$, $1 \leq j \leq 8$.

Because the degree of the near-net forming sand mold cavity approaching the sand mold cavity 3 is directly proportional to the size of an envelope volume of an extrusion unit envelope surface of the near-net forming sand mold cavity, sand mold digital flexible extrusion near-net forming optimization is equivalent to the solution of a maximum value of an envelope volume of a flexible extrusion array in the near-net forming sand mold cavity 3, so an objective function $V(x,y) = 80 \times 80 \times \sum_{j=1}^{8} \sum_{i=1}^{10} [f_{i,j}(x,y)_{min}]$ mm$^3$ is established.

Theoretically, in order to make the near-net forming sand mold cavity approach the sand mold cavity 3, search calculation for $V(x,y)$ may be performed within a plane feasible region of the sand mold digital flexible extrusion array. Because the sand mold digital flexible extrusion array 1 consists of 10×8 80 mm×80 mm×250 mm identical arrays, a valid optimization interval may be reduced to a region $$R = \begin{cases} x \in [360 \text{ mm}, 440 \text{ mm}) \\ y \in [280 \text{ mm}, 360 \text{ mm}) \end{cases}$$

on the sand mold digital flexible extrusion array plane.

In a process of operating a search algorithm, it is convenient to search a feasible region, and the position of the sand mold cavity 3 is parallel shifted from the center A1, which is equal to (400 mm,320 mm), of the flexible extrusion array platform to a search initial position $A_{1,1}$, which is equal to (360 mm,280 mm).

A search direction is determined as an x increment direction and a y increment direction.

Search step length parameters Δx and Δy in x and y directions are determined according to error requirements of the x and y directions respectively, which is equal to search errors in the x and y directions are Δx and Δy.

Search is performed in the valid optimization interval R, envelope volume values $V(x,y)_{p,q}$ of the flexible extrusion array 1 calculated in a search process are compared, the larger value is saved as $V(x,y)_{max}$, the corresponding position is saved as $(x,y)_{max}$, and the corresponding value of $f_{i,j}(x,y)_{min}$ is recorded.

After the search is completed, the position of the sand mold cavity 3 is parallel shifted to $(x,y)_{max}$, and the height of each extrusion unit is increased or decreased according to the value of $f_{i,j}(x,y)_{min}$ recorded in the previous step.

The foregoing descriptions are merely preferred embodiments of the present disclosure and are not intended to limit the present disclosure. For those skilled in the art, the present disclosure may have various changes and modifications. Any modification, equivalent replacement, and improvement made within the principle of the present disclosure shall fall within the protection scope defined by the appended claims of the present disclosure.

What is claimed is:

1. A sand mold digital flexible extrusion near-net forming optimization method based on a search algorithm, the method comprising the following steps:
   (1) dividing a sand mold Computer Aided Design (CAD) 3D model near-net forming region into m×n sub-regions, each having a size of a×b, according to arrangement of m×n flexible extrusion arrays, each having a size of a×b, on a sand mold digital flexible extrusion working platform, the m×n flexible extrusion arrays being m×n arrays consisting of extrusion units;
   (2) directly acquiring a curved surface function $$f(x, y) = \begin{bmatrix} f_{1,1}(x,y)_{min} & \cdots & f_{1,j}(x,y)_{min} & \cdots & f_{1,n}(x,y)_{min} \\ \vdots & \ddots & \vdots & \iddots & \vdots \\ f_{i,1}(x,y)_{min} & \cdots & f_{i,j}(x,y)_{min} & \cdots & f_{i,n}(x,y)_{min} \\ \vdots & \iddots & \vdots & \ddots & \vdots \\ f_{m,1}(x,y)_{min} & \cdots & f_{m,j}(x,y)_{min} & \cdots & f_{m,n}(x,y)_{min} \end{bmatrix}$$

of a near-net forming sand mold CAD 3D model cavity under driving of a sand mold CAD 3D model, where i, j∈Z, and 1≤1≤m, 1≤j≤n;
   (3) constructing a flexible extrusion array envelope volume optimization objective function $V(x,y)=a\times b\times \sum_{j=1}^{n}\sum_{i=1}^{m}[f_{i,j}(x,y)_{min}]$ in the near-net forming sand mold CAD 3D model cavity;
   (4) determining a valid optimization interval $$R = \begin{cases} x \in \left[\frac{am}{2} - \frac{a}{2}, \frac{am}{2} + \frac{a}{2}\right) \\ y \in \left[\frac{bn}{2} - \frac{b}{2}, \frac{bn}{2} + \frac{b}{2}\right) \end{cases}$$

of a position of the near-net forming sand mold CAD 3D model cavity;
   (5) translating the position of the near-net forming sand mold CAD 3D model cavity to a search initial position A1,1, which is equal to $$\left(\frac{am}{2} - \frac{a}{2}, \frac{bn}{2} - \frac{b}{2}\right);$$

(6) determining a search direction as an x increment direction and a y increment direction;
   (7) determining search step length parameters Δx and Δy in x and y directions according to error requirements of the x and y directions respectively;
   (8) performing search in the valid optimization interval R, comparing flexible extrusion array envelope volume values $V(x,y)_{p,q}$ calculated in a search process, saving a larger value as $V(x,y)_{max}$, saving the corresponding position as $(x,y)_{max}$, and recording the corresponding value of $f_{i,j}(x,y)_{min}$, wherein p is the number of the search step length passed in a x direction of the x and y directions, and q is the number of the search step length in a y direction of the x and y directions; and
   (9) completing the search, translating the position of the near-net forming sand mold CAD 3D model cavity to $(x,y)_{max}$, and executing a flexible extrusion array shape adjusting procedure, the height of each extrusion unit of the extrusion units being increased or decreased according to the value of $f_{i,j}(x,y)_{min}$ recorded in the step (8), until the heights of all the extrusion units are adjusted.

2. The sand mold digital flexible extrusion near-net forming optimization method based on a search algorithm according to claim 1, wherein in step (1), the each extrusion unit has a length of a, a width of b and a height of h, and a forming space of a near-net forming sand mold on the sand mold digital flexible extrusion array is am×bn×h; and the sand mold CAD 3D model near-net forming region is divided into m×n sub-regions, each having a size of a×b, according to the arrangement of the m×n flexible extrusion arrays.

3. A sand mold digital flexible extrusion near-net forming optimization method based on a search algorithm, the method comprising the following steps:
   (1) dividing a sand mold Computer Aided Design (CAD) 3D model near-net forming region, the sand mold CAD 3D model near-net forming region being divided into m×n sub-regions, each having a size of a×b, according to arrangement of m×n flexible extrusion arrays, each having a size of a×b, on a sand mold digital flexible extrusion working platform, the m×n flexible extrusion arrays being m×n arrays consisting of extrusion units;
   (2) acquiring a curved sur face function of a near-net forming sand mold CAD 3D model cavity;
   (3) constructing a flexible extrusion array envelope volume optimization objective function;
   (4) determining a valid optimization interval R; and
   (5) performing a global search in the valid optimization interval R, and comparing flexible extrusion array envelope volume values, flexible extrusion array envelope volume values $V(x,y)_{i-1}$ calculated in a search process are compared, the larger value is saved as $V(x,y)_{max}$, the corresponding position is saved as $(x,y)_{max}$, and the corresponding value of $f_{i,j}(x,y)_{min}$ is recorded, p being the number of the search step length passed in a x direction of x and y directions, and q being the number of the search step length in a y direction of x and y directions, the position of the sand mold CAD 3D model cavity being parallel shifted to (x,y)max, and a flexible extrusion array shape adjusting procedure being executed the height of each extrusion unit of the extrusion units being increased or decreased according to the value of $f_{i,j}(x,y)_{min}$, until the heights of all the extrusion units are adjusted.

4. The sand mold digital flexible extrusion near-net forming optimization method based on a search algorithm according to claim 3, wherein after the valid optimization interval R is determined, a position of the ear-net forming sand mold CAD 3D model cavity is parallel shifted to a search initial position, and the global search is performed in the valid optimization interval R.

5. The sand mold digital flexible extrusion near-net forming optimization method based on a search algorithm according to claim 4, wherein after the position of the near-net forming sand mold CAD 3D model cavity is parallel shifted to the search initial position, a search direction and search step lengths are determined, and the global search is performed in the valid optimization interval R.

6. The sand mold digital flexible extrusion near-net forming optimization method based on a search algorithm according to claim 3, wherein after the global search performed in the valid, optimization interval R is completed, the position of the near-net forming sand mold CAD 3D model cavity is parallel shifted to a position corresponding to a larger value in the flexible extrusion array envelope volume values.

7. The sand mold digital flexible extrusion near-net forming optimization method based on a search algorithm according to claim 3, wherein in step (1), the each extrusion unit has a length of a, a width of b and a height of h, and a forming space of a near-net forming sand mold on the sand mold digital flexible extrusion array is am×bn×h, and the sand mold CAD 3D model near-net forming region is divided into m×n sub-regions, each having a size of a×b, according to the arrangement of m×n flexible extrusion arrays.

8. The sand mold digital flexible extrusion near-net forming optimization method based on a search algorithm according to claim 3, wherein in step (2), the curved surface function $$f(x,y) = \begin{bmatrix} f_{1,1}(x,y)_{min} & \cdots & f_{1,j}(x,y)_{min} & \cdots & f_{1,n}(x,y)_{min} \\ \vdots & \ddots & \vdots & \ddots & \vdots \\ f_{i,1}(x,y)_{min} & \cdots & f_{i,j}(x,y)_{min} & \cdots & f_{i,n}(x,y)_{min} \\ \vdots & \ddots & \vdots & \ddots & \vdots \\ f_{m,1}(x,y)_{min} & \cdots & f_{m,j}(x,y)_{min} & \cdots & f_{m,n}(x,y)_{min} \end{bmatrix}$$

of the near-net forming sand mold CAD 3D model cavity is directly acquired under driving of a sand mold CAD 3D model, where i, j∈Z, and 1≤i≤m, 1≤j≤n.

9. The sand mold digital flexible extrusion near-net forming optimization method based, on a search algorithm according to claim 8, wherein in step (3), the flexible extrusion array envelope volume optimization objective function $V(x,y)=a \times b \times \sum_{j=1}^{n} \sum_{i=1}^{m} [f_{i,j}(x,y)_{min}]$ in the near-net forming sand mold CAD 3D model cavity is constructed.

10. The sand mold digital flexible extrusion near-net forming optimization method based on a search algorithm according to claim 9, wherein in step (4), the valid optimization interval $$R = \begin{cases} x \in \left[\dfrac{am}{2} - \dfrac{a}{2}, \dfrac{am}{2} + \dfrac{a}{2}\right) \\ y \in \left[\dfrac{bn}{2} - \dfrac{b}{2}, \dfrac{bn}{2} + \dfrac{b}{2}\right) \end{cases}$$

of the position of the near-net forming sand mold CAD 3D model cavity is determined.

11. The sand mold digital flexible extrusion near-net forming optimization method based on a search algorithm according to claim 10, wherein after the valid optimization interval R is determined, the position of the near-net forming sand mold CAD 3D model cavity is parallel shifted to a search initial position $A_{1,1}$, which is equal to $$\left(\dfrac{am}{2} - \dfrac{a}{2}, \dfrac{bn}{2} - \dfrac{b}{2}\right),$$

and a global search is performed in the valid optimization interval R.

12. The sand mold digital flexible extrusion near-net forming optimization method based on a search algorithm according to claim 11, wherein after the position of the sand mold CAD 3D model cavity is parallel shifted to the search initial position, a search direction is determined as an x increment direction and a y increment direction, and the global search is performed in the valid optimization interval R.

13. The sand mold digital flexible extrusion near-net forming optimization method based on a search algorithm according to claim 12, wherein after the search direction is determined as the x increment direction and the y increment direction, search step length parameters Δx and Δy in x and y directions are determined according to error requirements of the x and y directions respectively, and the global search is performed in the valid optimization interval R.

* * * * *